(12) United States Patent
Zhou et al.

(10) Patent No.: US 12,498,248 B2
(45) Date of Patent: Dec. 16, 2025

(54) METHOD FOR FUSING ROAD DATA TO GENERATE A MAP, ELECTRONIC DEVICE, AND STORAGE MEDIUM

(71) Applicant: Apollo Intelligent Driving Technology (Beijing) Co., Ltd., Beijing (CN)

(72) Inventors: Yao Zhou, Beijing (CN); Hantian Zhang, Beijing (CN); Liang Peng, Beijing (CN); Guowei Wan, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 181 days.

(21) Appl. No.: 18/063,772

(22) Filed: Dec. 9, 2022

(65) Prior Publication Data

US 2023/0104225 A1 Apr. 6, 2023

(30) Foreign Application Priority Data

Dec. 10, 2021 (CN) .......................... 202111506806.4

(51) Int. Cl.
*G01C 21/00* (2006.01)
(52) U.S. Cl.
CPC ................................. *G01C 21/3815* (2020.08)
(58) Field of Classification Search
CPC ........................... G01C 21/3815; G01C 21/38; G01C 21/3859; G01C 21/3863; G06F 16/29; G06N 5/022; G06T 17/05; G06T 17/20; G06T 17/10; G06T 11/60; G06T 2207/30241
USPC ........................................................ 701/400
See application file for complete search history.

(56) References Cited

U.S. PATENT DOCUMENTS

| | | | | |
|---|---|---|---|---|
| 9,739,620 | B2* | 8/2017 | Duan | G01C 21/26 |
| 10,244,345 | B2* | 3/2019 | Banerjee | H04W 4/021 |
| 11,500,099 | B2* | 11/2022 | Liang | G06N 3/02 |
| 2013/0158871 | A1* | 6/2013 | Joh | G01C 21/28 |
| | | | | 703/2 |

(Continued)

FOREIGN PATENT DOCUMENTS

| | | |
|---|---|---|
| CN | 108010316 A | 5/2018 |
| CN | 105279371 B | 2/2019 |

(Continued)

OTHER PUBLICATIONS

Extended European Search Report issued in European Application No. 22212465.3, mailed on May 8, 2023 (8 pages).

(Continued)

*Primary Examiner* — Andrew R Dyer
(74) *Attorney, Agent, or Firm* — Osha Bergman Watanabe & Burton LLP

(57) ABSTRACT

A method for fusing road data to generate a map, includes: determining benchmark road data and at least one road data to be fused in a target road area; establishing, successively for each road data to be fused, a first road element association relationship between the first sub road data and the benchmark road data; establishing a second road element association relationship between the second sub road data and the benchmark road data according to the first road element association relationship; and fusing the benchmark road data and the road data to be fused according to the above association relationships to update the benchmark road data.

15 Claims, 8 Drawing Sheets

(56) References Cited

U.S. PATENT DOCUMENTS

| | | | |
|---|---|---|---|
| 2016/0153787 A1* | 6/2016 | Dong | G01C 21/26 |
| | | | 701/533 |
| 2018/0023961 A1* | 1/2018 | Fridman | H04N 7/18 |
| | | | 382/104 |
| 2019/0360818 A1* | 11/2019 | Linder | G01C 21/30 |
| 2020/0105134 A1* | 4/2020 | Pietrobon | G08G 1/0133 |
| 2020/0151611 A1* | 5/2020 | McGavran | G09B 29/102 |
| 2020/0158515 A1* | 5/2020 | Berry | H04W 4/02 |
| 2020/0226925 A1* | 7/2020 | Zeng | G01C 21/3815 |
| 2020/0292327 A1* | 9/2020 | Rabel | G06V 20/582 |
| 2020/0311118 A1* | 10/2020 | Gupta | G06F 16/437 |
| 2020/0311124 A1* | 10/2020 | Gupta | H04N 21/4524 |
| 2021/0095971 A1* | 4/2021 | Mao | G06F 16/29 |
| 2021/0133218 A1* | 5/2021 | Bukowski | G06F 16/288 |
| 2021/0389156 A1* | 12/2021 | Li | G01C 21/30 |
| 2022/0011136 A1* | 1/2022 | Zeng | G01C 21/3453 |
| 2022/0024482 A1* | 1/2022 | Yang | G01S 13/867 |
| 2022/0065656 A1* | 3/2022 | Young | B60W 60/0059 |
| 2022/0297728 A1* | 9/2022 | Varadarajan | G06V 10/82 |
| 2022/0302997 A1* | 9/2022 | Beeler | G06N 20/20 |

FOREIGN PATENT DOCUMENTS

| | | |
|---|---|---|
| CN | 111007530 A | 4/2020 |
| CN | 111459953 A | 7/2020 |
| CN | 110334174 B | 4/2021 |
| CN | 112862881 A | 5/2021 |
| CN | 113155141 A | 7/2021 |
| CN | 113704853 A | 11/2021 |
| JP | 2010175756 A | 8/2010 |

OTHER PUBLICATIONS

Office Action issued for corresponding Chinese patent application 202111506806.4 issued Jul. 13, 2022 (18 pages).

Second Office Action issued for corresponding Chinese patent application 202111506806.4 issued Oct. 14, 2022 (21 pages).

Office Action issued for Japanese patent application No. 2022-196787, mailed Oct. 17, 2023 (12 pages).

* cited by examiner

METHOD FOR FUSING ROAD DATA TO GENERATE A MAP, ELECTRONIC DEVICE, AND STORAGE MEDIUM

CROSS-REFERENCE TO RELATED APPLICATIONS

This application claims the benefit of priority to Chinese Patent Application No. 202111506806.4, filed on Dec. 10, 2021, the contents of which are incorporated herein by reference in their entireties for all purposes.

TECHNICAL FIELD

The present disclosure relates to the field of artificial intelligence technology, particularly to the field of auto-driving, cloud computing, and intelligent transportation technology, in particular to a method for fusing road data to generate a map, an electronic device, and a storage medium.

BACKGROUND

Currently, a method for fusing road data to generate a map is mainly to collect point cloud data from a target road area using an acquisition vehicle equipped with a high-level inertial navigation equipment, high beam radar and Global Navigation Satellite System (GNSS) equipment, splice the collected multiple point cloud data to generate a point cloud map, and mark the road elements on the point cloud map to obtain a road map of the target road area.

In the above scheme, personnel are needed to manually splice the multiple point cloud data and manually mark the road elements, which results in a high cost, low accuracy, and low efficiency.

SUMMARY

According to an aspect of the present disclosure, there is provided a method for fusing road data to generate a map, including: determining benchmark road data and at least one road data to be fused in a target road area, in which the road data to be fused includes a plurality of sub road data, the sub road data includes a trajectory segment and surrounding road element data of trajectory points in the trajectory segment, and in the plurality of sub road data, a positioning signal quality of first sub road data is higher than that of second sub road data; establishing, successively for each road data to be fused, a first road element association relationship between the first sub road data and the benchmark road data; establishing a second road element association relationship between the second sub road data and the benchmark road data according to the first road element association relationship; and fusing the benchmark road data and the road data to be fused according to the first road element association relationship and the second road element association relationship to update the benchmark road data, until all of the at least one road data to be fused is processed, to obtain road area data of the target road area.

According to yet another aspect of the present disclosure, there is provided an electronic device, including at least one processor and a memory communicatively coupled to the at least one processor. The at least one processor is configured to: determine benchmark road data and at least one road data to be fused in a target road area, in which the road data to be fused includes a plurality of sub road data, the sub road data includes a trajectory segment and surrounding road element data of trajectory points in the trajectory segment, and in the plurality of sub road data, a positioning signal quality of first sub road data is higher than that of second sub road data; establish, successively for each road data to be fused, a first road element association relationship between the first sub road data and the benchmark road data; establish a second road element association relationship between the second sub road data and the benchmark road data according to the first road element association relationship; and fuse the benchmark road data and the road data to be fused according to the first road element association relationship and the second road element association relationship to update the benchmark road data, until all of the at least one road data to be fused is processed, to obtain road area data of the target road area.

According to yet another aspect of the present disclosure, there is provided a non-transitory computer-readable storage medium having computer instructions stored thereon. The computer instructions are configured to cause a computer to implement a method for fusing road data to generate a map, including: determining benchmark road data and at least one road data to be fused in a target road area, in which the road data to be fused includes a plurality of sub road data, the sub road data includes a trajectory segment and surrounding road element data of trajectory points in the trajectory segment, and in the plurality of sub road data, a positioning signal quality of first sub road data is higher than that of second sub road data; establishing, successively for each road data to be fused, a first road element association relationship between the first sub road data and the benchmark road data; establishing a second road element association relationship between the second sub road data and the benchmark road data according to the first road element association relationship; and fusing the benchmark road data and the road data to be fused according to the first road element association relationship and the second road element association relationship to update the benchmark road data, until all of the at least one road data to be fused is processed, to obtain road area data of the target road area.

It should be understood that the content described in this section is not intended to identify key or important features of the embodiments of the present disclosure, nor is it intended to limit the scope of the present disclosure. Additional features of the present disclosure will be easily understood based on the following description.

BRIEF DESCRIPTION OF THE DRAWINGS

The drawings are used to better understand the solution and do not constitute a limitation to the present disclosure, in which.

DETAILED DESCRIPTION

Embodiments of the present disclosure are described below with reference to the accompanying drawings, including various details of the embodiments of the present disclosure to facilitate understanding, which shall be considered illustrative. Therefore, those of ordinary skill in the art should recognize that various changes and modifications can be made to the embodiments described herein without departing from the scope and spirit of the present disclosure. For clarity and conciseness, descriptions of well-known functions and structures are omitted in the following description.

Currently, a method for fusing road data to generate a map is mainly to collect point cloud data from a target road area using an acquisition vehicle equipped with a high-level inertial navigation equipment, high beam radar and Global Navigation Satellite System (GNSS) equipment, splice the collected multiple point cloud data to generate a point cloud map, and mark the road elements on the point cloud map to obtain a road map of the target road area.

In the above scheme, personnel are needed to manually splice the multiple point cloud data and manually mark the road elements, which results in a high cost, low accuracy, and low efficiency.

In view of the above problems, the present disclosure provides a method for fusing road data to generate a map, an apparatus and an electronic device.

Figure 1:
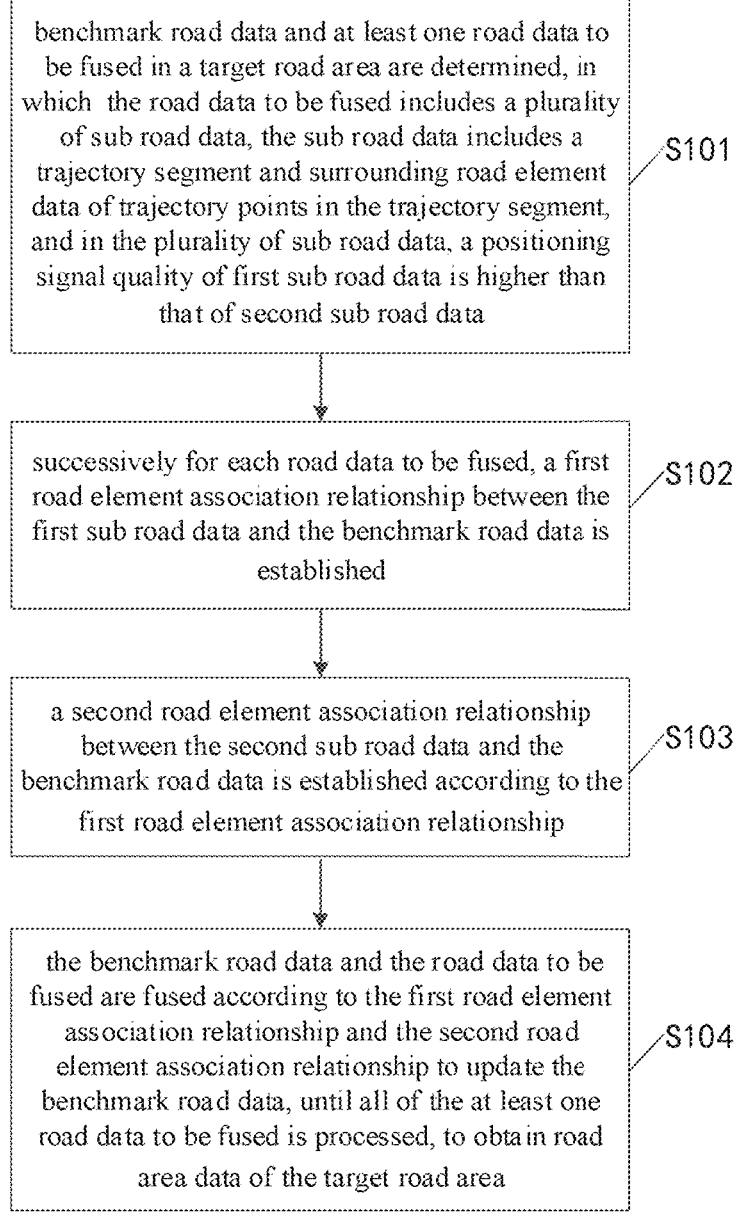
FIG. 1 is a flowchart according to a first embodiment of the present disclosure.

FIG. 1 is a flowchart according to a first embodiment of the present disclosure. It should be noted that method for fusing road data to generate a map according to embodiments of the present disclosure can be applied to an apparatus for fusing road data to generate a map, which can be configured in an electronic device to enable the electronic device to perform a function of fusing road data to generate a map.

The electronic device can be any device with computing power. The device with computing power can be, for example, a personal computer (PC), a mobile terminal, a server, etc. The mobile terminal can be, for example, an onboard device, a mobile phone, a tablet, a personal digital assistant, a wearable device, and other hardware devices having various operating systems, touch screens, and/or displays. In the present disclosure, the electronic device is taken as a cloud device for illustration.

As illustrated in FIG. 1, the method for fusing road data to generate a map includes the following steps.

At block S101, benchmark road data and at least one road data to be fused in a target road area are determined. Each of the at least one road data to be fused includes a plurality of sub road data, each of the plurality of sub road data includes a trajectory segment and surrounding road element data of trajectory points in the trajectory segment, and in the plurality of sub road data, a positioning signal quality of first sub road data is higher than that of second sub road data.

In the embodiment of the present disclosure, the target road area can be any road section to generate road area data, for example, a road between two adjacent intersections. The road has a driving direction and may have one or more lanes. When the road between two adjacent intersections is a two-way road, the two-way road can be split according to the direction to obtain two one-way roads, and the two one-way roads are respectively used as the target road area.

In the embodiment of the present disclosure, the benchmark road data can be a first road data to be fused, or a road data to be fused randomly selected from a plurality of road data to be fused. The benchmark road data and the road data to be fused can be data collected by a vehicle sensor of any vehicle when the vehicle travels on the target road area once, or data obtained by processing the collected data, so as to generate the road area data according to the data collected by the vehicle sensor of any vehicle, reducing generation cost and improving generation efficiency.

In the embodiment of the present disclosure, the plurality of road data to be fused can be data collected by way of using a crowdsourcing map. The crowdsourcing map refers to an automatic driving map generated by transferring collected road data to the cloud for data fusion based on sensors of the automatic driving vehicle or other low-cost sensor hardware. This method has low cost, high coverage and good timeliness.

In the embodiment of the present disclosure, the sensor may be, for example, a positioning sensor, a camera, or the like. The positioning sensor can be used to locate a position of a vehicle during driving, and the camera can be used to collect images around the vehicle. The type and number of sensors on the vehicle can be set according to actual needs.

In the embodiment of the present disclosure, the plurality of sub road data included in the road data to be fused can be obtained by segmenting a trajectory of the vehicle driving in the target road area according to the positioning signal quality. Each trajectory segment and data of the surrounding road elements of the trajectory points in the trajectory segment constitute one sub road data. The segmentation based on the positioning signal quality contributes to adopt different process strategies for different sub road data, which improves the accuracy of the generated road area data.

In the embodiment of the present disclosure, the surrounding road elements in the surrounding road element data, for example, can be at least one of the following elements: lane lines, signboards, speed limit signs on the road, direction signs on the road, etc., which can be supplemented according to actual needs, and are not specifically defined here.

At block S102, successively for each road data to be fused, a first road element association relationship between the first sub road data and the benchmark road data is established.

In the embodiment of the present disclosure, the first sub road data the sub road data with higher positioning signal quality. Thus, for the first sub road data, due to the higher positioning signal quality, the positioning accuracy of the trajectory points is higher. The surrounding road element data includes world coordinate information of the surrounding road elements. For the same surrounding road element, the world coordinate information for multiple times of positioning is theoretically the same, and if there is a difference, it is because of the positioning accuracy. Therefore, for the surrounding road element data of two adjacent trajectory points in the trajectory segment, due to the high positioning signal quality and high positioning accuracy, the difference between the world coordinate information of the same surrounding road element for multiple times of positioning is small. When associating the road elements in two times of positioning, it is easy to establish an association relationship between the same surrounding road element in two times of positioning, that is, the accuracy of the obtained road element association relationship is high. Therefore, the association relationship between the first sub road data and the benchmark road data can be established directly based on the first sub road data and the benchmark road data.

At block S103, a second road element association relationship between the second sub road data and the benchmark road data is established according to the first road element association relationship.

In the embodiment of the present disclosure, most of the surrounding road elements in the surrounding road element data of two adjacent trajectory points are coincident, for example, the trajectory point A and trajectory point B are adjacent, most of the surrounding road elements of trajectory point A exist in the surrounding road element data of trajectory point B. Therefore, there is an association relationship between the coincident surrounding road features in the surrounding road feature data of two adjacent trajectory points. The establishment of the association relationship can refer to the establishment of the association relationship in S102.

In the embodiment of the present disclosure, for the trajectory points at both ends of the trajectory segment in the second sub road data, such as trajectory point C and trajectory point D, a first adjacent trajectory point of trajectory point C is located in the trajectory segment in the first sub road data, and the positioning signal quality of the first adjacent trajectory point is high, the accuracy of the association between the surrounding road elements in the surrounding road element data of the first adjacent trajectory point and the road elements in the benchmark road data is relatively high. Therefore, for trajectory point C, with the association relationship between the surrounding road elements of the first adjacent trajectory point and the road elements in the benchmark road data, and the association relationship between the surrounding road elements of trajectory point C and the surrounding road elements of the first adjacent trajectory point, the association relationship between the surrounding road elements of trajectory point C and the road elements in the benchmark road data can be determined, which can further improve the accuracy of the determined association relationship. For a second adjacent trajectory point of trajectory point C, with the association relationship between the surrounding road elements of trajectory point C and the road elements in the benchmark road data, and the association relationship between the surrounding road elements of trajectory point C and the surrounding road elements of the second adjacent trajectory point, the association relationship between the surrounding road elements of trajectory point C and the road elements in the benchmark road data can be determined. The processing of trajectory point D is similar to that of trajectory point C. For the processing of other trajectory points of the trajectory segment in the second sub road data, a reference can be made with respect to the processing of the second adjacent trajectory point of the trajectory point C. No further details will be given here.

At block S104, the benchmark road data and the road data to be fused are fused according to the first road element association relationship and the second road element association relationship to update the benchmark road data, until all of the at least one road data to be fused is processed, to obtain road area data of the target road area.

In the embodiment of the present disclosure, the number of road data to be fused is multiple, such as N. Then, for the first road data to be fused, with the first road element association relationship and the second road element association relationship between this road data to be fused and the benchmark road data, this road data to be fused and the benchmark road data are fused to obtain an updated benchmark road data; z In the embodiment of the present disclosure, in another example, it is also possible to set a plurality of benchmark road data, select one of the benchmark road data for each road data to be fused, and then determine the first road element association relationship and the second road element association relationship, then perform the fusion processing to update the benchmark road data, and finally fuse the several updated benchmark road data to obtain the road data of the target road area.

In the embodiment of the present disclosure, after S104, the method may further include a step of generating a road map of the target road area according to the road area data. Then, according to the road map of each road area, a complete road map can be generated.

According to the method for fusing road data to generate a map of the embodiment of the present disclosure, the benchmark road data and the at least one road data to be fused in the target road area are determined, in which the road data to be fused includes the plurality of sub road data, the sub road data includes the trajectory segment and the surrounding road element data of the trajectory points in the trajectory segment, and in the plurality of sub road data, the positioning signal quality of the first sub road data is higher than that of the second sub road data; successively for each road data to be fused, the first road element association relationship between the first sub road data and the benchmark road data is established; the second road element association relationship between the second sub road data and the benchmark road data is established according to the first road element association relationship; the benchmark road data and the road data to be fused are fused according to the first road element association relationship and the second road element association relationship to update the benchmark road data, until all of the at least one road data to be fused is processed, to obtain the road area data of the target road area. Therefore, for the second sub road data with low positioning signal quality, the second road element association relationship of the second sub road data can be determined with the first road element association relationship of the first sub road data, improving the accuracy of the determined association relationship and improving the accuracy of the generated road area data.

Figure 2:
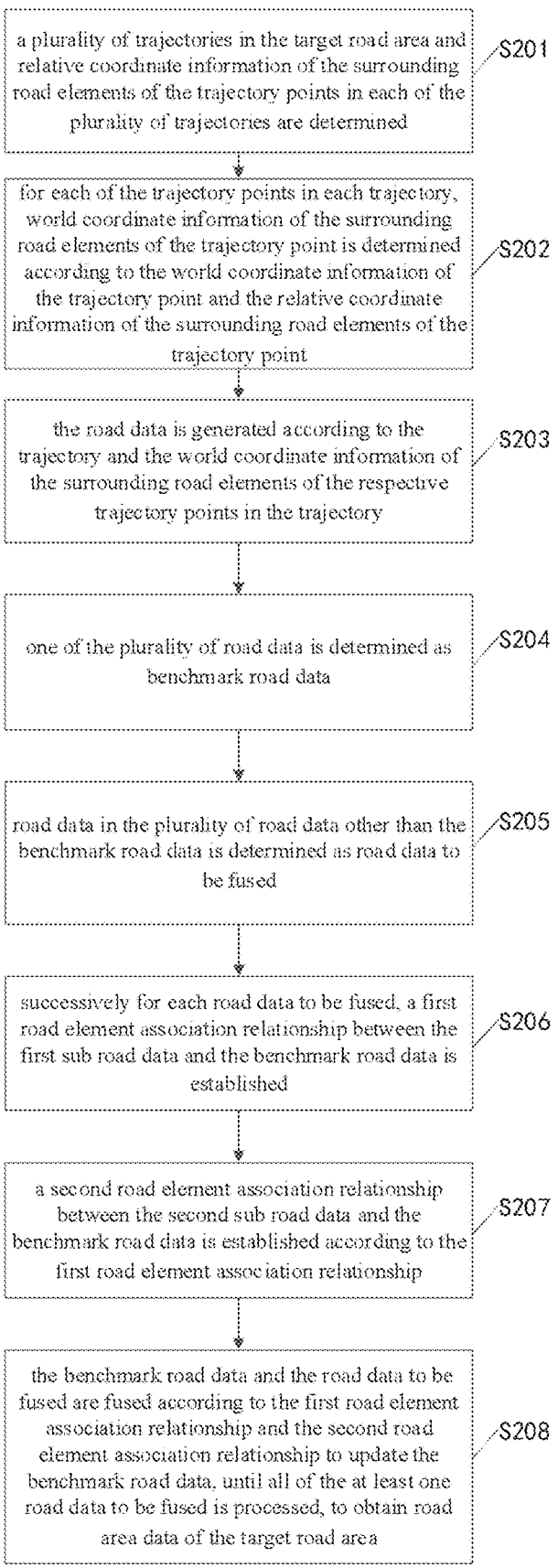
FIG. 2 is a flowchart according to a second embodiment of the present disclosure.

In order to accurately determine the benchmark road data and at least one road data to be fused in the target road area, and improve the generation efficiency of the road data, as illustrated in FIG. 2 which is the flowchart according to a second embodiment of the present disclosure, in the embodiment of the present disclosure, a plurality of trajectories in the target road area and relative coordinate information of the surrounding road elements of trajectory points in each trajectory can be obtained to determine the road data. The embodiment shown in FIG. 2 can include the following steps.

At block S201, a plurality of trajectories in the target road area and relative coordinate information of the surrounding road elements of the trajectory points in each of the plurality of trajectories are determined.

In the embodiment of the present disclosure, when any vehicle travels in the target road area once, trajectory points collected by the positioning sensor of the vehicle can be connected to obtain a trajectory. A plurality of trajectories can be obtained when a plurality of vehicles travel in the target road area once respectively. Alternatively, a plurality of trajectories can be obtained when a single vehicle travels multiple times in the target road area.

In the embodiment of the present disclosure, when the vehicle is driving in the target road area, a camera on the vehicle may collect a surrounding image once every certain period of time, and the position of the vehicle at the time point of collecting the surrounding image, that is, a trajectory point in the trajectory. For each trajectory point, the relative coordinate information of the surrounding road elements of the trajectory point can be obtained by performing a road element recognition on the surrounding image of the trajectory point. The relative coordinate information is the coordinate information of the surrounding road elements of the trajectory point relative to the position of the trajectory point.

At block S202, for each of the trajectory points in each trajectory, world coordinate information of the surrounding road elements of the trajectory point is determined according to the world coordinate information of the trajectory point and the relative coordinate information of the surrounding road elements of the trajectory point.

In the embodiment of the present disclosure, the positioning sensor of the vehicle may collect the world coordinate information of the trajectory point; or the world coordinate information of the trajectory point may be determined according to the data collected by the positioning sensor of the vehicle. According to the world coordinate information of the trajectory point and the relative coordinate information of the surrounding road elements of the trajectory point relative to this trajectory point, the world coordinate information of the surrounding road elements of the trajectory point can be determined.

At block S203, the road data is generated according to the trajectory and the world coordinate information of the surrounding road elements of the respective trajectory points in the trajectory.

In the embodiment of the present disclosure, for each trajectory, the road data is generated according to this trajectory and the world coordinate information of the surrounding road elements of the respective trajectory points in this trajectory; a plurality of road data can be generated according to the plurality of trajectories.

At block S204, one of the plurality of road data is determined as benchmark road data.

In the embodiment of the present disclosure, the number of the benchmark road data can be one or more. For example, when the number of benchmark road data is one, one random road data among the plurality of road data can be used as the benchmark road data.

At block S205, road data in the plurality of road data other than the benchmark road data is determined as road data to be fused.

In the embodiment of the present disclosure, the road data to be fused may include the trajectory and the surrounding road element data of the trajectory points in the trajectory. The trajectory is obtained by locating with the positioning sensor, so that the trajectory can be segmented according to the positioning signal quality of the positioning sensor to obtain multiple trajectory segments. For example, the quality threshold of the positioning signal quality is determined, the trajectory point of which the corresponding positioning signal quality is the quality threshold in the trajectory is determined, this trajectory point is taken as the segmentation point, and then the trajectory is segmented to obtain multiple trajectory segments. It should be noted that when the positioning signal quality of each trajectory point in the trajectory is greater than or equal to the quality threshold, the trajectory can be directly used as one trajectory segment. That is, the trajectory is segmented to obtain only one trajectory segment.

In the embodiment of the present disclosure, for each trajectory segment of which the positioning signal quality is greater than the quality threshold, first sub road data can be generated according to the trajectory segment and the surrounding road element data of the trajectory points in the trajectory segment. For each trajectory segment of which the positioning signal quality is less than the quality threshold, second sub road data can be generated according to the trajectory segment and the surrounding road element data of the trajectory points in the trajectory segment.

At block S206, successively for each road data to be fused, a first road element association relationship between the first sub road data and the benchmark road data is established.

At block S207, a second road element association relationship between the second sub road data and the benchmark road data is established according to the first road element association relationship.

At block S208, the benchmark road data and the road data to be fused are fused according to the first road element association relationship and the second road element association relationship to updated the benchmark road data, until all of the at least one road data to be fused is processed, to obtain road area data of the target road area.

The detailed description of S206 to S208 can refer to the detailed description of S102 to S104 in the embodiment illustrated in FIG. 1, and will not be described in detail here.

According to the method for fusing road data to generate a map of the embodiment of the present disclosure, the plurality of trajectories in the target road area and the relative coordinate information of the surrounding road elements of the trajectory points in each of the plurality of trajectories are determined; for each of the trajectory points in each trajectory, the world coordinate information of the surrounding road elements of the trajectory point is determined according to the world coordinate information of the trajectory point and the relative coordinate information of the surrounding road elements of the trajectory point; the road data is generated according to the trajectory and the world coordinate information of the surrounding road elements of the respective trajectory points in the trajectory; one of the plurality of road data is determined as the benchmark road data; the road data in the plurality of road data other than the benchmark road data is determined as the road data to be fused; successively for each road data to be fused, the first road element association relationship between the first sub road data and the benchmark road data is established; the second road element association relationship between the second sub road data and the benchmark road data is established according to the first road element association relationship; the benchmark road data and the road data to be fused are fused according to the first road element association relationship and the second road element association relationship to update the benchmark road data, until all of the at least one road data to be fused is processed, to obtain the road area data of the target road area. Therefore, for the second sub road data with low positioning signal quality, the second road element association relationship of the second sub road data can be determined with the first road element association relationship of the first sub road data, improving the accuracy of the determined association relationship and improving the accuracy of the generated road area data.

Figure 3:
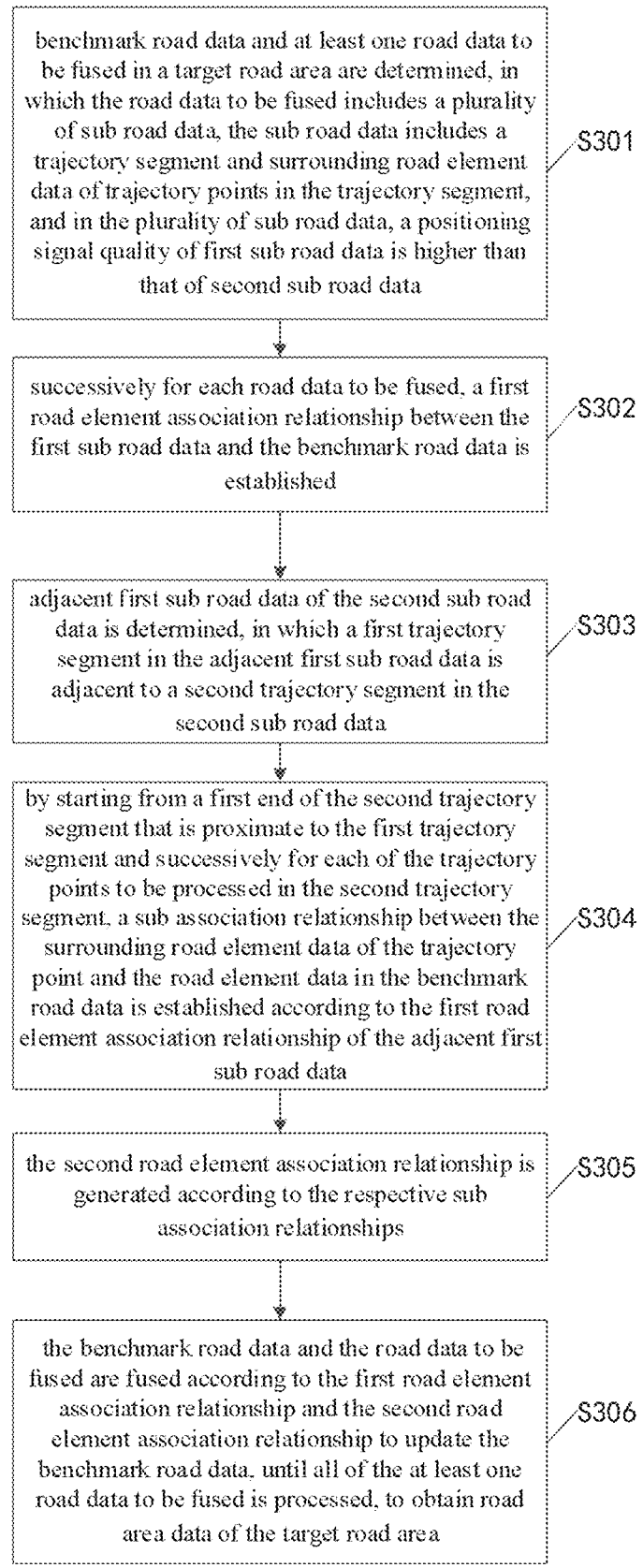
FIG. 3 is a flowchart according to a third embodiment of the present disclosure.

In order to accurately determine the second road element association relationship between the second sub road data and the benchmark road data, for each trajectory point in the second trajectory segment, a sub association relationship between the surrounding road elements and the road elements in the benchmark road data can be determined with the first road element association relationship, so as to further improve the accuracy of the determined second road element association relationship. As illustrated in FIG. 3, which is a flowchart according to a third embodiment of the present disclosure, the embodiment shown in FIG. 3 can include the following steps.

At block S301, benchmark road data and at least one road data to be fused in a target road area are determined. The road data to be fused includes a plurality of sub road data, the sub road data includes a trajectory segment and surrounding road element data of trajectory points in the trajectory segment, and in the plurality of sub road data, a positioning signal quality of first sub road data is higher than that of second sub road data.

At block S302, successively for each road data to be fused, a first road element association relationship between the first sub road data and the benchmark road data is established.

At block S303, adjacent first sub road data of the second sub road data is determined, in which a first trajectory segment in the adjacent first sub road data is adjacent to a second trajectory segment in the second sub road data.

In the embodiment of the present disclosure, the number of adjacent first sub road data may be one or two. When the number is two, the trajectory segments adjacent to both ends of the second trajectory segment in the second sub road data are the trajectory segments in the first sub road data.

At block S304, by starting from a first end of the second trajectory segment that is proximate to the first trajectory segment and successively for each of the trajectory points to be processed in the second trajectory segment, a sub association relationship between the surrounding road element data of the trajectory point and the road element data in the benchmark road data is established according to the first road element association relationship of the adjacent first sub road data.

In the embodiment of the present disclosure, for example, the number of adjacent first sub road data of the second sub road data is one, it is supposed that the second trajectory segment in the second sub road data may include 5 trajectory points from A1 to A5, in which A1 is the trajectory point proximate to the first trajectory segment. First for the trajectory point A1, the sub association relationship between the surrounding road element data of the trajectory point A1 and the road element data in the benchmark road data is determined according to the first road element association relationship of the adjacent first sub road data. Then for the trajectory point A2, the sub association relationship between the surrounding road element data of the trajectory point A2 and the road element data in the benchmark road data is determined, according to the first road element association relationship of the adjacent first sub road data and the sub association relationship between the surrounding road element data of the trajectory point A1 and the road element data in the benchmark road data. Then the above processing is performed on the trajectory point A3, the trajectory point A4 and the trajectory point A5, respectively.

In the embodiment of the present disclosure, for example, the number of adjacent first sub road data of the second sub road data is two, that is, there are two adjacent first trajectory segments of the second trajectory segment, respectively, a first trajectory segment B and a first trajectory segment C. It is supposed that the second trajectory segment in the second sub road data may include 5 trajectory points from A1 to A5, in which A1 is the trajectory point proximate to the first trajectory segment B, A5 is the trajectory point proximate to the first trajectory segment C. Then the following two processes are performed in parallel: the first process is to determine the above sub association relationship by starting from the trajectory point A1; the second process is to determine the above sub association relationship by starting from the trajectory point A5, until all the trajectory points in the second trajectory segment are processed.

In the embodiment of the present disclosure, because the positioning signal quality of the second trajectory segment is low, a difference between the position information of the same road elements in the surrounding road elements of the trajectory points in the second trajectory segment and the road elements in the benchmark road data may be large, which affects the determination of the sub association relationship. Therefore, in order to improve the accuracy of the determined sub association relationship, in the process of performing S304, the following processes may be also performed: determine whether the established sub association relationships meet a preset deviation condition, and determine whether all of the trajectory points in the second trajectory segment are processed; when not all of the trajectory points in the second trajectory segment are processed, but the respective established sub association relationships meet the deviation condition, an intermediate transformation relationship between the second sub road data and the benchmark road data can be determined according to the established sub association relationships, and the second sub road data can be transformed based on the intermediate transformation relationship to obtain updated second sub road data; then based on the updated second sub road data, S304 is continued to perform, and during the performing of S304, the above determinations and processing are continued to perform until the respective trajectory points in the second trajectory segment are fully processed.

In the embodiment of the present disclosure, when the respective established sub association relationships meet a preset deviation condition and not all of the trajectory points in the second trajectory segment are processed, the intermediate transformation relationship between the second sub road data and the benchmark road data is determined according to the respective established sub association relationships, and the second sub road data is transformed based on the intermediate transformation relationship to obtain the updated second sub road data. This can reduce the difference between the position information of the same road elements in the surrounding road elements of the trajectory points in the second trajectory segment and the road elements in the benchmark road data, that is, the difference is reduced, so as to improve the accuracy of the determined sub association relationship.

The process of determining whether the respective established sub association relation relationships meet the preset deviation condition can be, for example, to: determine the position information of the surrounding road elements for which the sub association relationships have been established in the second sub road data and the position information of the associated road elements in the benchmark road data, according to the respective established sub association relationships; then determine distance differences between the surrounding road elements for which the sub association relationships have been established and the associated road elements; then determine an average value of the respective distance differences; then determine whether the average value is greater than or equal to a preset distance threshold; determine that the preset deviation condition is met when the average value is greater than or equal to the preset distance threshold; and determine that the preset deviation condition is not met when the average value is less than the preset distance threshold.

At block S305, the second road element association relationship is generated according to the respective sub association relationships.

At block S306, the benchmark road data and the road data to be fused are fused according to the first road element association relationship and the second road element association relationship to update the benchmark road data, until all of the at least one road data to be fused is processed, to obtain road area data of the target road area.

The detailed description of S301, S302 and S306 can refer to the detailed description of S101, S102 and S104 in the embodiment illustrated in FIG. 1, and will not be described in detail here.

According to the method for fusing road data to generate a map of the embodiment of the present disclosure, the plurality of trajectories in the target road area and the relative coordinate information of the surrounding road elements of the trajectory points in each of the plurality of trajectories are determined; for each of the trajectory points in each trajectory, the world coordinate information of the surrounding road elements of the trajectory point is determined according to the world coordinate information of the trajectory point and the relative coordinate information of the surrounding road elements of the trajectory point; the road data is generated according to the trajectory and the world coordinate information of the surrounding road elements of the respective trajectory points in the trajectory; one of the plurality of road data is determined as the benchmark road data; the road data in the plurality of road data other than the benchmark road data is determined as the road data to be fused; successively for each road data to be fused, the first road element association relationship between the first sub road data and the benchmark road data is established; the adjacent first sub road data of the second sub road data is determined, in which the first trajectory segment in the adjacent first sub road data is adjacent to the second trajectory segment in the second sub road data; by starting from the first end of the second trajectory segment that is proximate to the first trajectory segment and successively for each of the trajectory points to be processed in the second trajectory segment, the sub association relationship between the surrounding road element data of the trajectory point and the road element data in the benchmark road data is established according to the first road element association relationship of the adjacent first sub road data; the second road element association relationship is generated according to the respective sub association relationships; the second road element association relationship between the second sub road data and the benchmark road data is established according to the first road element association relationship; the benchmark road data and the road data to be fused are fused according to the first road element association relationship and the second road element association relationship to update the benchmark road data, until all of the at least one road data to be fused is processed, to obtain the road area data of the target road area. Therefore, the second road element association relationship can be determined with the first road element association relationship and the association relationships between the surrounding road elements of two adjacent trajectory points in the second trajectory segment, improving the accuracy of the determined association relationship and improving the accuracy of the generated road area data.

Figure 4:
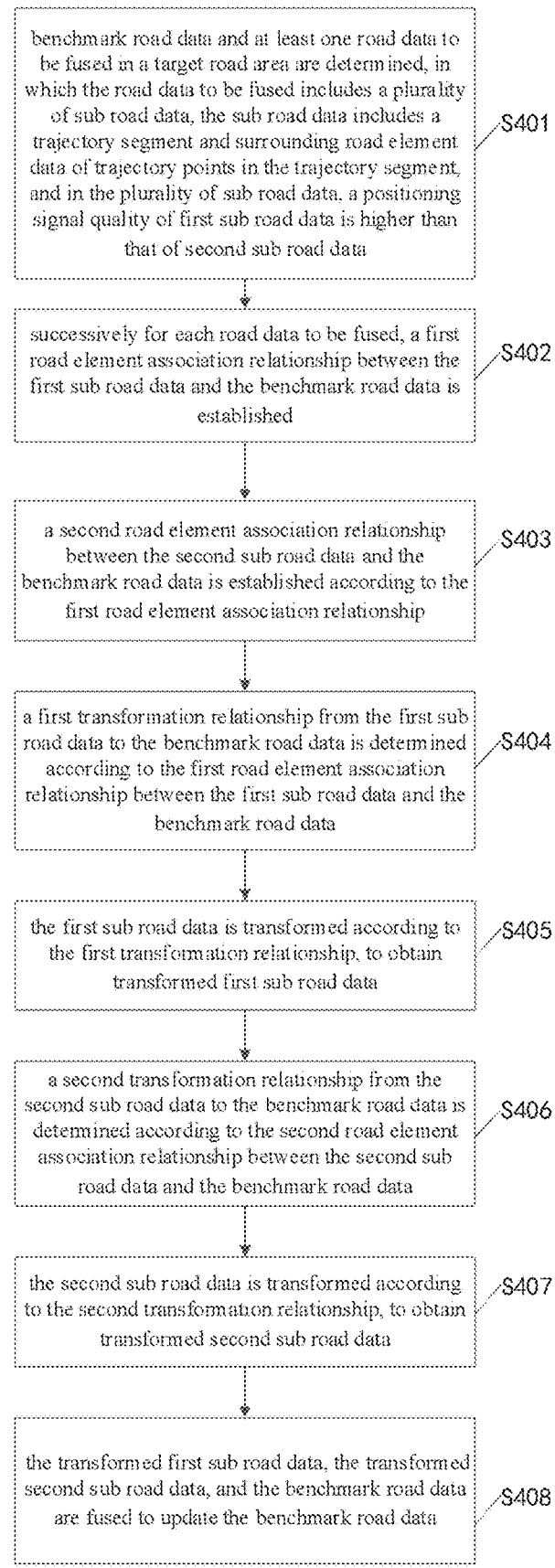
FIG. 4 is a flowchart according to a fourth embodiment of the present disclosure.

In order to improve the accuracy of the fusion of the benchmark road data and the road data to be fused, as illustrated in FIG. 4, which is a flowchart according to a fourth embodiment of the present disclosure, in the embodiment of the present disclosure, a transformation relationship between the road data to be fused and the benchmark road data can be determined according to the first road element association relationship and the second road element association relationship, and then a transformation processing and a fusion processing can be performed. The embodiment shown in FIG. 4 can include the following steps.

At block S401, benchmark road data and at least one road data to be fused in a target road area are determined. The road data to be fused includes a plurality of sub road data, the sub road data includes a trajectory segment and surrounding road element data of trajectory points in the trajectory segment, and in the plurality of sub road data, a positioning signal quality of first sub road data is higher than that of second sub road data.

At block S402, successively for each road data to be fused, a first road element association relationship between the first sub road data and the benchmark road data is established.

At block S403, a second road element association relationship between the second sub road data and the benchmark road data is established according to the first road element association relationship.

At block S404, a first transformation relationship from the first sub road data to the benchmark road data is determined according to the first road element association relationship between the first sub road data and the benchmark road data.

In the embodiment of the present disclosure, the first transformation relationship may be a sum of a translation relationship, a rotation relationship and a deformation relationship between the first sub road data and the benchmark road data. That is, the first transformation relation may be a transformation matrix, which is composed of a translation matrix, a rotation matrix and a deformation matrix. The process of performing S404 can be, for example, to: take the first transformation relationship as a variable, and determine transformed first sub road data based on the variable and the first sub road data; construct a first constraint relationship function based on this variable, based on the transformed first sub road data, the benchmark road data, and a preset first constraint relationship function framework; and adjust the value of the variable, so that the value of the first constraint relationship function is less than a preset threshold or meets a preset condition.

For example, when the road element is lane line, the first constraint relationship function may be obtained by summing three parts, which are an energy term of distance to lane line between data, an energy term of distance to lane line in data, and a prior energy term of global pose. It is assumed that the first sub road data includes a set of lane line elements and a set of trajectory points, and the set of trajectory points is a set composed of trajectory points in the trajectory segment in the first sub road data. The set of lane line elements is K lane lines, $\{L_k, k \in \{1, 2, \ldots, K\}\}$, each lane line is a set composed of several control points, $L_k = \{P_i = (x_i, y_i, z_i), i \in \{1, 2, \ldots, N\}\}$, the set of trajectory points is $\{J_m, m \in \{1, 2, \ldots, M\}\}$, each trajectory point J includes a time point, a pose T (the pose of the trajectory point relative to the first trajectory point in the trajectory segment), and several observations of lane line elements under the trajectory point coordinate system $\{o_k, k \in \{1, 2, \ldots, K\}\}$, that is, the set of surrounding road elements of the trajectory point. After the first road element association relationship between the first sub road data and the benchmark road data is established, the trajectory point of the trajectory segment in the first sub road data may construct an observation on the lane line in the benchmark road data, $\{o_k^{AB}, k \in \{1, 2, \ldots, K\}\}$, similarly, the trajectory point in the benchmark road data may construct an observation on the lane line in the first sub road data, $\{o_k^{BA}, k \in \{1, 2, \ldots, K\}\}$.

The energy term of distance to lane line between data, the energy term of distance to lane line in data, and the prior energy term of global pose can be expressed as the following formulas (1)-(3):

$$E = \Sigma_m \Sigma_k \Sigma_i \|Dis(o_{m,k}^{AB}, T_{A,m}^{-1} P_{k,i}^{B})\|^2 + \Sigma_m \Sigma_k \Sigma_i \|Dis(o_{m,k}^{BA}, T_{B,m}^{-1} P_{k,i}^{A})\|^2 \quad (1)$$

$$E = \Sigma \Sigma_m \Sigma_k \Sigma_i \|Dis(o_{m,k}, T_m^{-1} P_{k,i})\|^2 \quad (2)$$

$$E = \Sigma_m \|T_m^{-1} T_m^{ori}\|^2 \quad (3)$$

where A can represent the first sub road data, B can represent the benchmark road data, and $T^{ori}$ can represent the relative pose of the trajectory point relative to the first trajectory point in the trajectory segment.

At block S405, the first sub road data is transformed according to the first transformation relationship, to obtain transformed first sub road data.

In the embodiment of the present disclosure, according to the first transformation relationship, the position information of the respective trajectory points in the trajectory segment of the first sub road data can be transformed, and the position information of the surrounding road elements in the surrounding road element data of the first sub road data can be transformed, to obtain the transformed first sub road data.

At block S406, a second transformation relationship from the second sub road data to the benchmark road data is determined according to the second road element association relationship between the second sub road data and the benchmark road data.

In the embodiment of the present disclosure, the second transformation relationship may be a sum of a translation relationship, a rotation relationship and a deformation relationship between the second sub road data and the benchmark road data. That is, the second transformation relation may be a transformation matrix, which is composed of a translation matrix, a rotation matrix and a deformation matrix. The process of performing S406 can be, for example, to: take the second transformation relationship as a variable, and determine transformed second sub road data based on the variable and the second sub road data; construct a second constraint relationship function based on this variable, based on the transformed second sub road data, the benchmark road data, and a preset second constraint relationship function framework; and adjust the value of the variable, so that the value of the second constraint relationship function is less than a preset threshold or meets a preset condition.

For example, when the road element is lane line, the second constraint relationship function may be obtained by summing four parts, which are an energy term of distance to lane line between data, an energy term of distance to lane line in data, a prior energy term of global pose, and a prior energy term of relative pose of trajectory. It is assumed that the second sub road data includes a set of lane line elements and a set of trajectory points, and the set of trajectory points is a set composed of trajectory points in the trajectory segment in the second sub road data. The set of lane line elements is K lane lines, $\{L_k, k \in \{1, 2, \ldots, K\}\}$, each lane line is a set composed of several control points, $L_k = \{P_i = (x_i, y_i, z_i), i \in \{1, 2, \ldots, N\}\}$, the set of trajectory points is $\{J_m, m \in \{1, 2, \ldots, M\}\}$, each trajectory point J includes a time point, world coordinate information T, and several observations of lane line elements under the trajectory point coordinate system $\{o_k, k \in \{1, 2, \ldots, K\}\}$, that is, the set of surrounding road elements of the trajectory point.

The formulas of the energy term of distance to lane line between data, the energy term of distance to lane line in data, and the prior energy term of global pose can refer to the formulas (1)-(3). The prior energy term of relative pose of trajectory can be expressed as the following formula (4):

$$E = \Sigma_{m-1} \|T_{m-1}^{-1} \cdot T_m \cdot (T_{m-1}^{ori})^{-1} \cdot T_m^{ori}\|^2 \quad (4)$$

At block S407, the second sub road data is transformed according to the second transformation relationship, to obtain transformed second sub road data.

At block S408, the transformed first sub road data, the transformed second sub road data, and the benchmark road data are fused to update the benchmark road data.

In the embodiment of the present disclosure, the process of performing S408 can be, for example, to: overlay the transformed first sub road data, the transformed second sub road data, and the benchmark road data, perform a deduplication, that is, retain only one piece of data for each road element, such as only one piece of position information for the road element, to obtain the fused data, and update the fused data as the benchmark road data.

Figure 5:
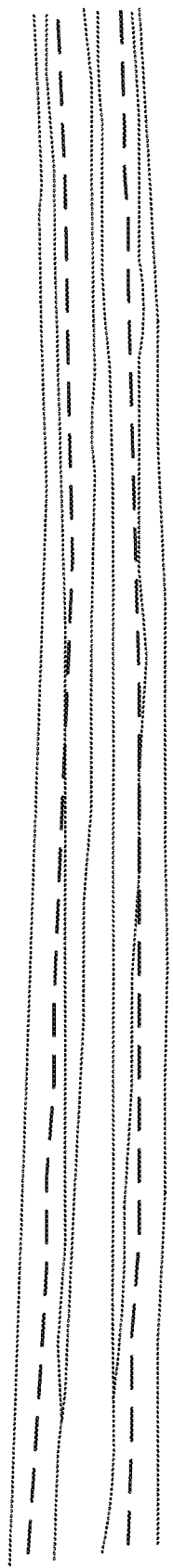
FIG. 5 is a schematic diagram of a direct fusion of first sub road data, second sub road data, and benchmark road data.
Figure 6:
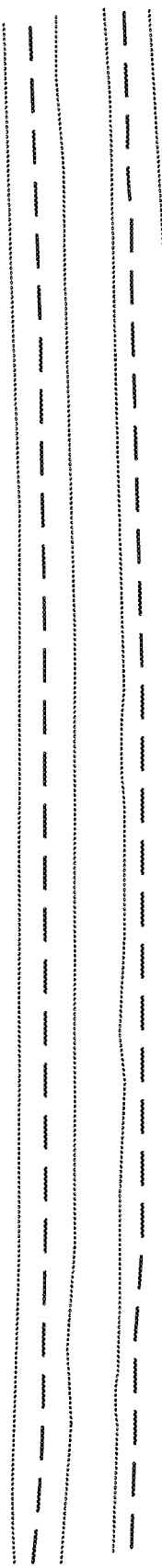
FIG. 6 is a schematic diagram of a fusion of transformed first sub road data, transformed second sub road data, and benchmark road data.

The direct fusion of the first sub road data, the second sub road data and the benchmark road data are illustrated in FIG. 5. The fusion of the transformed first sub road data, the transformed second sub road data, and the benchmark road data are illustrated in FIG. 6. Comparing FIG. 5 and FIG. 6, the accuracy of the fused road data in FIG. 6 is greater than that the accuracy of the fused road data in FIG. 5. In FIG. 5 and FIG. 6, the dashed lines represent the trajectory points, and the dotted lines represent the lane lines.

According to the method for fusing road data to generate a map of the embodiment of the present disclosure, the benchmark road data and the at least one road data to be fused in the target road area are determined, in which each of the at least one road data to be fused includes the plurality of sub road data, each of the plurality of sub road data includes the trajectory segment and the surrounding road element data of the trajectory points in the trajectory segment, and in the plurality of sub road data, the positioning signal quality of the first sub road data is higher than that of the second sub road data; successively for each road data to be fused, the first road element association relationship between the first sub road data and the benchmark road data is established; the second road element association relationship between the second sub road data and the benchmark road data is established according to the first road element association relationship; the first transformation relationship from the first sub road data to the benchmark road data is determined according to the first road element association relationship between the first sub road data and the benchmark road data; the first sub road data is transformed according to the first transformation relationship, to obtain the transformed first sub road data; the second transformation relationship from the second sub road data to the benchmark road data is determined according to the second road element association relationship between the second sub road data and the benchmark road data; the second sub road data is transformed according to the second transformation relationship, to obtain the transformed second sub road data; the transformed first sub road data, the transformed second sub road data, and the benchmark road data are fused to update the benchmark road data, until all of the at least one road data to be fused is processed, to obtain the road area data of the target road area. Therefore, for the second sub road data with low positioning signal quality, the second road element association relationship of the second sub road data can be determined with the first road element association relationship of the first sub road data, improving the accuracy of the determined association relationship and improving the accuracy of the generated road area data.

In order to more clearly illustrate the above embodiments, examples are given as follows.

Figure 7:
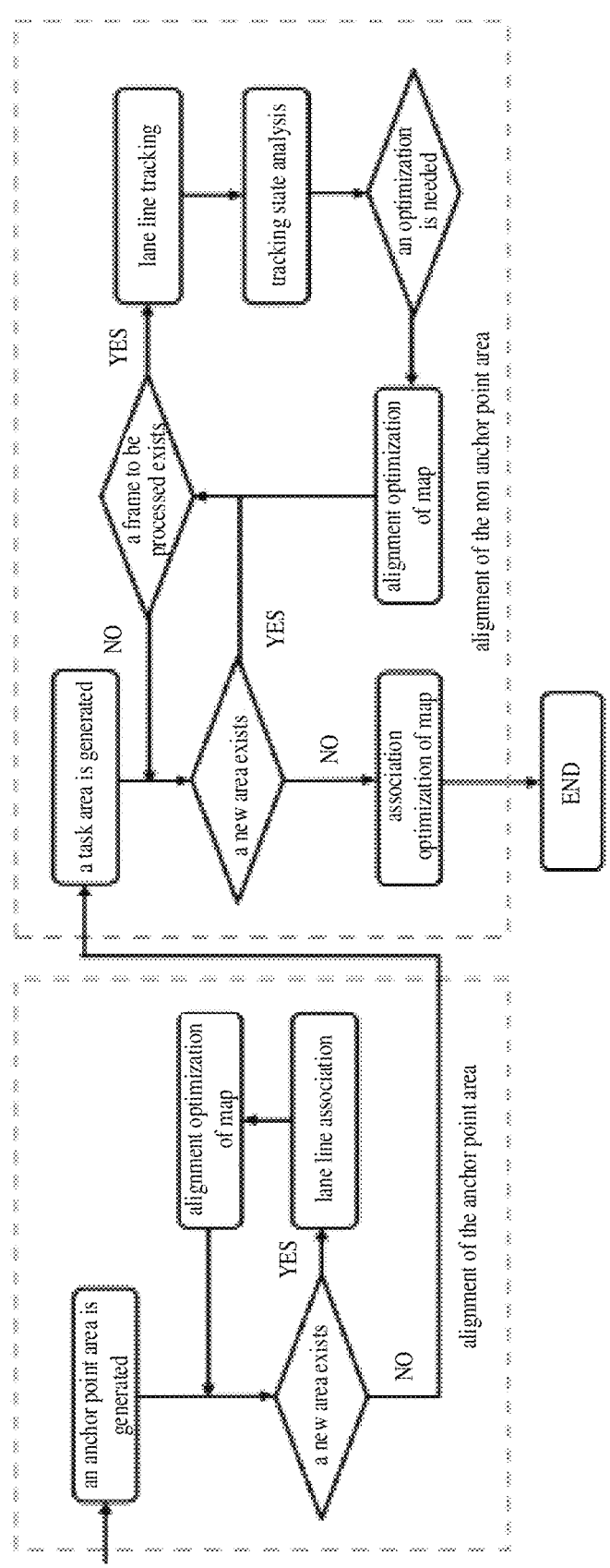
FIG. 7 is a flowchart of generating road area data.
Figure 8:
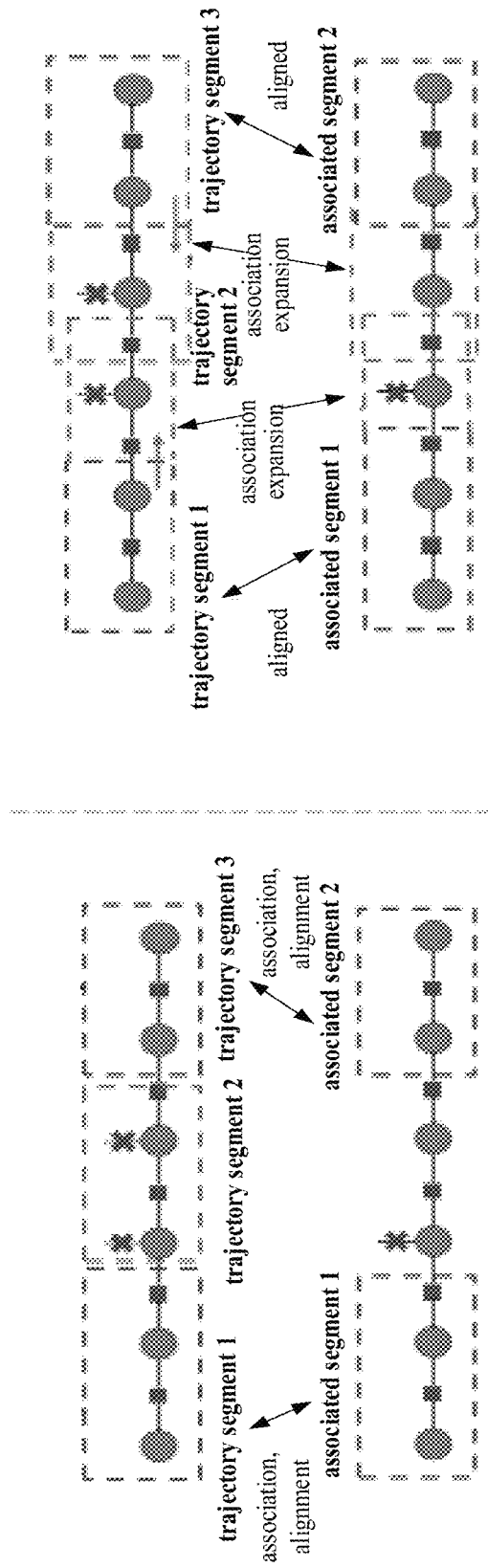
FIG. 8 is a schematic diagram of trajectory segments.

For example, as illustrated in FIG. 7, which is a flowchart of generating road area data. In FIG. 7, the benchmark road data and a road data to be fused are taken as an example, the first sub road data (anchor point area data) and the second sub road data (task area data) in the road data to be fused are determined; for the first sub road data, when there is the first sub road data, at first, a first road element association relationship (for example, the lane line association) between surrounding road elements of the first sub road data and road elements in the benchmark road data is established; then the first transformation relationship is determined based on the first road element association relationship, and the first sub road data is transformed (that is, alignment optimization); then, when there is the second sub road data, the trajectory points in the trajectory segment of the second sub road data (the surrounding road element data of the trajectory point is obtained from the image collected at the trajectory point, the image is a frame to be processed) are successively processed, association relationships between the surrounding road elements of the trajectory point and the road elements in the benchmark road data are established (i.e. lane line tracking), and it is determined that whether the association relationships meet a deviation condition (i.e. tracking state analysis); when the association relationships meet the deviation condition (i.e. an optimization is needed), an intermediate transformation relationship is determined, and the transformation is performed (i.e. alignment optimization); and then other trajectory points in the trajectory segment of the second sub road data are processed until the processing is complete. The schematic diagram of trajectory segments is illustrated in FIG. 8. In FIG. 8, there are illustrated the trajectory segments of respective sub road data in the road data to be fused and the trajectory in the benchmark road data. There are three trajectory segments, the positioning signal quality of the trajectory segments at two ends is higher, and the positioning signal quality of the middle trajectory segment is lower, the association processing and transformation processing are performed to the surrounding road element data of the trajectory segments at both ends (that is, association and alignment), then the association processing and transformation processing are performed to the surrounding road element data of the middle trajectory segment (i.e., association expansion and alignment).

Figure 9:
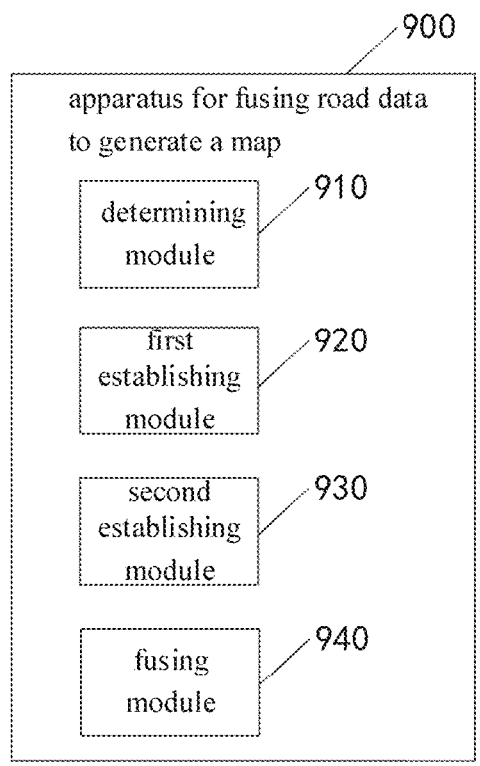
FIG. 9 is a block diagram according to a fifth embodiment of the present disclosure.

As illustrated in FIG. 9, which is a block diagram according to a fifth embodiment of the present disclosure. An apparatus 900 for fusing road data to generate a map includes a determining module 910, a first establishing module 920, a second establishing module 930, and a fusing module 940.

The determining module 910 is configured to determine benchmark road data and at least one road data to be fused in a target road area, in which each of the at least one road data to be fused includes a plurality of sub road data, each of the plurality of sub road data includes a trajectory segment and surrounding road element data of trajectory points in the trajectory segment, and in the plurality of sub road data, a positioning signal quality of first sub road data is higher than that of second sub road data.

The first establishing module 920 is configured to establish, successively for each road data to be fused, a first road element association relationship between the first sub road data and the benchmark road data.

The second establishing module 930 is configured to establish a second road element association relationship between the second sub road data and the benchmark road data according to the first road element association relationship.

The fusing module 940 is configured to fuse the benchmark road data and the road data to be fused according to the first road element association relationship and the second road element association relationship to update the benchmark road data, until all of the at least one road data to be fused is processed, to obtain road area data of the target road area.

As a possible implementation of the embodiment of the present disclosure, the surrounding road element data includes feature data of each of surrounding road elements, the first establishing module 920 is specifically configured to: select, successively for each road data to be fused and for each surrounding road element in the respective road data to be fused, a road element associated with the surrounding road element from the benchmark road data according to the feature data of the surrounding road element; and generate the first road element association relationship according to the respective surrounding road elements in the road data to be fused and the associated road elements.

As a possible implementation of the embodiment of the present disclosure, the second establishing module 930 is specifically configured to: determine adjacent first sub road data of the second sub road data, in which a first trajectory segment in the adjacent first sub road data is adjacent to a second trajectory segment in the second sub road data; establish, by starting from a first end of the second trajectory segment that is proximate to the first trajectory segment and successively for each of the trajectory points to be processed in the second trajectory segment, a sub association relationship between the surrounding road element data of the trajectory point and the road element data in the benchmark road data according to the first road element association relationship of the adjacent first sub road data; and generate the second road element association relationship according to the respective sub association relationships.

As a possible implementation of the embodiment of the present disclosure, the second establishing module 930 is specifically configured to: determine adjacent first sub road data of the second sub road data, in which a first trajectory segment in the adjacent first sub road data is adjacent to a second trajectory segment in the second sub road data; establish, by starting from a first end of the second trajectory segment that is proximate to the first trajectory segment and successively for each of the trajectory points to be processed in the second trajectory segment, a sub association relationship between the surrounding road element data of the trajectory point and the road element data in the benchmark road data according to the first road element association relationship of the adjacent first sub road data; determine, when the respective established sub association relationships meet a preset deviation condition and not all of the trajectory points in the second trajectory segment are processed, an intermediate transformation relationship between the second sub road data and the benchmark road data according to the respective established sub association relationships, and transform the second sub road data based on the intermediate transformation relationship to obtain updated second sub road data; repeat the above two steps until all of the trajectory points in the second trajectory segment are processed; and generate the second road element association relationship according to the respective established sub association relationships.

As a possible implementation of the embodiment of the present disclosure, the number of the adjacent first sub road data is one or two.

As a possible implementation of the embodiment of the present disclosure, the fusing module 940 is specifically configured to: determine a first transformation relationship from the first sub road data to the benchmark road data, according to the first road element association relationship between the first sub road data and the benchmark road data; transform the first sub road data to obtain transformed first sub road data according to the first transformation relationship; determine a second transformation relationship from the second sub road data to the benchmark road data, according to the second road element association relationship between the second sub road data and the benchmark road data; transform the second sub road data to obtain transformed second sub road data according to the second transformation relationship; and fuse the transformed first sub road data, the transformed second sub road data, and the benchmark road data to update the benchmark road data.

As a possible implementation of the embodiment of the present disclosure, the determining module 910 is specifically configured to: determine a plurality of road data in the target road area; determine one of the plurality of road data as the benchmark road data; and determine road data in the plurality of road data other than the benchmark road data as the road data to be fused.

As a possible implementation of the embodiment of the present disclosure, the surrounding road element data includes world coordinate information of surrounding road elements, and the determining module 910 is specifically configured to: determine a plurality of trajectories in the target road area, and relative coordinate information of the surrounding road elements of the trajectory points in each of the plurality of trajectories; determine, for each of the trajectory points in each trajectory, the world coordinate information of the surrounding road elements of the trajectory point according to the world coordinate information of the trajectory point and the relative coordinate information of the surrounding road elements of the trajectory point; and generate the road data according to the trajectory and the world coordinate information of the surrounding road elements of the respective trajectory points in the trajectory.

As a possible implementation of the embodiment of the present disclosure, the apparatus further includes a generating module configured to generate a road map of the target road area according to the road area data.

According to the apparatus for fusing road data to generate a map of the embodiment of the present disclosure, the benchmark road data and the at least one road data to be fused in the target road area are determined, in which each of the at least one road data to be fused includes the plurality of sub road data, each of the plurality of sub road data includes the trajectory segment and the surrounding road element data of the trajectory points in the trajectory segment, and in the plurality of sub road data, the positioning signal quality of the first sub road data is higher than that of the second sub road data; successively for each road data to be fused, the first road element association relationship between the first sub road data and the benchmark road data is established; the second road element association relationship between the second sub road data and the benchmark road data is established according to the first road element association relationship; the benchmark road data and the road data to be fused are fused according to the first road element association relationship and the second road element association relationship to update the benchmark road data, until all of the at least one road data to be fused is processed, to obtain the road area data of the target road area. Therefore, for the second sub road data with low positioning signal quality, the second road element association relationship of the second sub road data can be determined with the first road element association relationship of the first sub road data, improving the accuracy of the determined association relationship and improving the accuracy of the generated road area data.

In the technical scheme of the present disclosure, the collection, storage, use, processing, transmission, provision and publication of the personal information of the users involved are carried out with the consent of the users, and are in conformity with relevant laws and regulations, and are not in violation of public order and good customs.

According to the embodiments of the present disclosure, the present disclosure also provides an electronic device, a readable storage medium and a computer program product.

Figure 10:
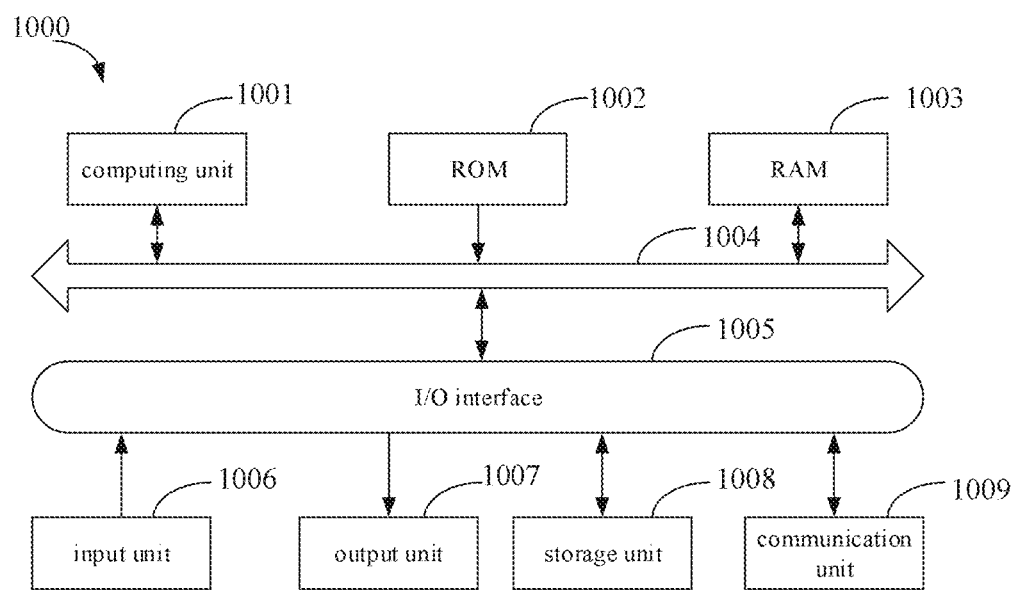
FIG. 10 is a block diagram of an electronic device configured to implement a method of fusing road data to generate a map according to embodiments of the present disclosure.

FIG. 10 is a block diagram of an example electronic device 1000 used to implement embodiments of the present disclosure. Electronic devices are intended to represent various forms of digital computers, such as laptop computers, desktop computers, workbenches, personal digital assistants, servers, blade servers, mainframe computers, and other suitable computers. Electronic devices may also represent various forms of mobile devices, such as personal digital processing, cellular phones, smart phones, wearable devices, and other similar computing devices. The components shown here, their connections and relations, and their functions are merely examples, and are not intended to limit the implementation of the present disclosure described and/or required herein.

As illustrated in FIG. 10, the device 1000 includes a computing unit 1001 performing various appropriate actions and processes based on computer programs stored in a read-only memory (ROM) 1002 or computer programs loaded from the storage unit 1008 to a random access memory (RAM) 1003. In the RAM 1003, various programs and data required for the operation of the device 1000 are stored. The computing unit 1001, the ROM 1002, and the RAM 1003 are connected to each other through a bus 1004. An input/output (I/O) interface 1005 is also connected to the bus 1004.

Components in the device 1000 are connected to the I/O interface 1005, including: an input unit 1006, such as a keyboard, a mouse; an output unit 1007, such as various types of displays, speakers; a storage unit 1008, such as a disk, an optical disk; and a communication unit 1009, such as network cards, modems, and wireless communication transceivers. The communication unit 1009 allows the device 1000 to exchange information/data with other devices through a computer network such as the Internet and/or various telecommunication networks.

The computing unit 1001 may be various general-purpose and/or dedicated processing components with processing and computing capabilities. Some examples of computing unit 1001 include, but are not limited to, a central processing unit (CPU), a graphics processing unit (GPU), various dedicated AI computing chips, various computing units that run machine learning model algorithms, and a digital signal processor (DSP), and any appropriate processor, controller and microcontroller. The computing unit 1001 executes the various methods and processes described above, such as the method for fusing road data to generate a map. For example, in some embodiments, the method for fusing road data to generate a map may be implemented as a computer software program, which is tangibly contained in a machine-readable medium, such as the storage unit 1008. In some embodiments, part or all of the computer program may be loaded and/or installed on the device 1000 via the ROM 1002 and/or the communication unit 1009. When the computer program is loaded on the RAM 1003 and executed by the computing unit 1001, one or more steps of the method described above may be executed. Alternatively, in other embodiments, the computing unit 1001 may be configured to perform the method in any other suitable manner (for example, by means of firmware).

Various implementations of the systems and techniques described above may be implemented by a digital electronic circuit system, an integrated circuit system, Field Programmable Gate Arrays (FPGAs), Application Specific Integrated Circuits (ASICs), Application Specific Standard Products (ASSPs), System on Chip (SOCs), Load programmable logic devices (CPLDs), computer hardware, firmware, software, and/or their combination. These various implementations may be realized in one or more computer programs, the one or more computer programs may be executed and/or interpreted on a programmable system including at least one programmable processor, which may be a dedicated or general programmable processor for receiving data and instructions from the storage system, at least one input device and at least one output device, and transmitting the data and instructions to the storage system, the at least one input device and the at least one output device.

The program code configured to implement the method of the present disclosure may be written in any combination of one or more programming languages. These program codes may be provided to the processors or controllers of general-purpose computers, dedicated computers, or other programmable data processing devices, so that the program codes, when executed by the processors or controllers, enable the functions/operations specified in the flowchart and/or block diagram to be implemented. The program code may be executed entirely on the machine, partly executed on the machine, partly executed on the machine and partly executed on the remote machine as an independent software package, or entirely executed on the remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus, or device, or any suitable combination of the foregoing. More specific examples of machine-readable storage media include electrical connections based on one or more wires, portable computer disks, hard disks, random access memories (RAM), read-only memories (ROM), electrically programmable read-only-memory (EPROM), flash memory, fiber optics, compact disc read-only memories (CD-ROM), optical storage devices, magnetic storage devices, or any suitable combination of the foregoing.

In order to provide interaction with a user, the systems and techniques described herein may be implemented on a computer having a display device (e.g., a Cathode Ray Tube (CRT) or a Liquid Crystal Display (LCD) monitor) for displaying information to a user; and a keyboard and pointing device (such as a mouse or trackball) through which the user can provide input to the computer. Other kinds of devices may also be used to provide interaction with the user. For example, the feedback provided to the user may be any form of sensory feedback (e.g., visual feedback, auditory feedback, or haptic feedback), and the input from the user may be received in any form (including acoustic input, voice input, or tactile input).

The systems and technologies described herein can be implemented in a computing system that includes background components (for example, a data server), or a computing system that includes middleware components (for example, an application server), or a computing system that includes front-end components (for example, a user computer with a graphical user interface or a web browser, through which the user can interact with the implementation of the systems and technologies described herein), or includes such background components, intermediate computing components, or any combination of front-end components. The components of the system may be interconnected by any form or medium of digital data communication (e.g., a communication network). Examples of communication networks include: local area network (LAN), wide area network (WAN), the Internet and the block-chain network.

The computer system may include a client and a server. The client and server are generally remote from each other and interacting through a communication network. The client-server relation is generated by computer programs running on the respective computers and having a client-server relation with each other. The server may be a cloud server, a server of distributed system or a server combined with block-chain.

It should be understood that the various forms of processes shown above can be used to reorder, add or delete steps. For example, the steps described in the present disclosure could be performed in parallel, sequentially, or in a different order, as long as the desired result of the technical solution disclosed in the present disclosure is achieved, which is not limited herein.

The above specific embodiments do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of the present disclosure shall be included in the protection scope of the present disclosure.

What is claimed is:

1. A method for fusing road data to generate a map, comprising:
   determining benchmark road data and at least one road data to be fused in a target road area, wherein the benchmark road data and the at least one road data to be fused are data collected by a sensor or data collected using a crowdsourcing map, wherein each of the at least one road data to be fused comprises trajectory and surrounding road element data of trajectory points in the trajectory, and the trajectory is obtained by locating with a positioning sensor;

obtaining first sub road data and second sub road data by segmenting the trajectory of the road data to be fused according to a positioning signal quality of the positioning sensor for locating the trajectory, wherein a positioning signal quality of first sub road data is higher than that of second sub road data, and the first sub road data comprises a first trajectory segment and surrounding road element data of trajectory points in the first trajectory segment, the second sub road data comprises a second trajectory segment and surrounding road element data of trajectory points in the second trajectory segment, and the first trajectory segment is adjacent to the second trajectory segment, wherein the surrounding road element data comprises world coordinate information of surrounding road elements, and the surrounding road elements comprises at least one of a lane line or a road traffic sign;

establishing, successively for each road data to be fused, a first road element association relationship between the first sub road data and the benchmark road data according to the surrounding road element data;

establishing a second road element association relationship between the second sub road data and the benchmark road data according to the first road element association relationship;

fusing the benchmark road data and the road data to be fused according to the first road element association relationship and the second road element association relationship to update the benchmark road data, until all of the at least one road data to be fused is processed, to obtain road area data of the target road area;

generating an autonomous driving map of the target road area according to the road area data, and sending the autonomous driving map to an autonomous driving vehicle for autonomous driving, wherein the autonomous driving map comprises the lane line, and the autonomous driving comprises autonomous driving based on the lane line of the autonomous driving map; and providing the autonomous driving map to the autonomous driving vehicle and causing the vehicle to perform autonomous driving based on the lane line represented in the autonomous driving map, wherein establishing the second road element association relationship between the second sub road data and the benchmark road data according to the first road element association relationship comprises:

establishing, by starting from a first end of the second trajectory segment that is adjacent to the first trajectory segment and successively for each of the trajectory points to be processed in the second trajectory segment, a sub association relationship between the surrounding road element data of the trajectory point and the road element data in the benchmark road data according to the first road element association relationship of the first sub road data and the surrounding road elements; and generating the second road element association relationship according to the respective sub association relationships.

2. The method according to claim 1, wherein the surrounding road element data comprises feature data of each of surrounding road elements, and establishing, successively for each road data to be fused, the first road element association relationship between the first sub road data and the benchmark road data comprises:

selecting, successively for each road data to be fused and for each surrounding road element in the respective road data to be fused, a road element associated with the surrounding road element from the benchmark road data according to the feature data of the surrounding road element; and generating the first road element association relationship according to the respective surrounding road elements in the road data to be fused and the associated road elements.

3. The method according to claim 1, wherein establishing the second road element association relationship between the second sub road data and the benchmark road data according to the first road element association relationship comprises:

determining adjacent first sub road data of the second sub road data, wherein a first trajectory segment in the adjacent first sub road data is adjacent to a second trajectory segment in the second sub road data;

establishing, by starting from a first end of the second trajectory segment that is elose adjacent to the first trajectory segment and successively for each of the trajectory points to be processed in the second trajectory segment, a sub association relationship between the surrounding road element data of the trajectory point and the road element data in the benchmark road data according to the first road element association relationship of the adjacent first sub road data;

determining, when the respective established sub association relationships meet a preset deviation condition and not all of the trajectory points in the second trajectory segment are processed, an intermediate transformation relationship between the second sub road data and the benchmark road data according to the respective established sub association relationships, and transforming the second sub road data based on the intermediate transformation relationship to obtain updated second sub road data;

repeating the above two steps until all of the trajectory points in the second trajectory segment are processed; and generating the second road element association relationship according to the respective established sub association relationships.

4. The method according to claim 3, wherein the number of the adjacent first sub road data is one or two.

5. The method according to claim 1, wherein fusing the benchmark road data and the road data to be fused according to the first road element association relationship and the second road element association relationship to update the benchmark road data comprises:

determining a first transformation relationship from the first sub road data to the benchmark road data, according to the first road element association relationship between the first sub road data and the benchmark road data;

transforming the first sub road data according to the first transformation relationship to obtain transformed first sub road data;

determining a second transformation relationship from the second sub road data to the benchmark road data, according to the second road element association relationship between the second sub road data and the benchmark road data;

transforming the second sub road data according to the second transformation relationship to obtain transformed second sub road data; and fusing the transformed first sub road data, the transformed second sub road data, and the benchmark road data to update the benchmark road data.

6. The method according to claim 1, wherein determining the benchmark road data and the at least one road data to be fused in the target road area comprises:
   determining a plurality of road data in the target road area;
   determining one of the plurality of road data as the benchmark road data; and
   determining road data in the plurality of road data other than the benchmark road data as the road data to be fused.

7. The method according to claim 6, wherein determining the plurality of road data in the target road area comprises:
   determining a plurality of trajectories in the target road area, and relative coordinate information of the surrounding road elements of the trajectory points in each of the plurality of trajectories;
   determining, for each of the trajectory points in each trajectory, the world coordinate information of the surrounding road elements of the trajectory point according to the world coordinate information of the trajectory point and the relative coordinate information of the surrounding road elements of the trajectory point; and
   generating the road data according to the trajectory and the world coordinate information of the surrounding road elements of the respective trajectory points in the trajectory.

8. An electronic device, comprising:
   at least one processor; and
   a memory communicatively coupled to the at least one processor; wherein,
   the at least one processor is configured to:
   determine benchmark road data and at least one road data to be fused in a target road area, wherein the at least one road data to be fused is data collected by a sensor or data collected using a crowdsourcing map, wherein each of the at least one road data to be fused comprises trajectory and surrounding road element data of trajectory points in the trajectory, and the trajectory is obtained by locating with a positioning sensor;
   obtain first sub road data and second sub road data by segmenting the trajectory of the road data to be fused according to a positioning signal quality of the positioning sensor for locating the trajectory, wherein a positioning signal quality of first sub road data is higher than that of second sub road data, and the first sub road data comprises a first trajectory segment and surrounding road element data of trajectory points in the first trajectory segment, the second sub road data comprises a second trajectory segment and surrounding road element data of trajectory points in the second trajectory segment, and the first trajectory segment is adjacent to the second trajectory segment, wherein the surrounding road element data comprises world coordinate information of surrounding road elements, and the surrounding road elements comprises at least one of a lane line or a road traffic sign;
   establish, successively for each road data to be fused, a first road element association relationship between the first sub road data and the benchmark road data according to the surrounding road element data;
   establish a second road element association relationship between the second sub road data and the benchmark road data according to the first road element association relationship;
   fuse the benchmark road data and the road data to be fused according to the first road element association relationship and the second road element association relationship to update the benchmark road data, until all of the at least one road data to be fused is processed, to obtain road area data of the target road area;
   generate an autonomous driving map of the target road area according to the road area data, and send the autonomous driving map to an autonomous driving vehicle for autonomous driving, wherein the autonomous driving map comprises the lane line, and the autonomous driving comprises autonomous driving based on the lane line of the autonomous driving map; and
   providing the autonomous driving map to the autonomous driving vehicle and causing the vehicle to perform autonomous driving based on the lane line represented in the autonomous driving map,
   wherein the at least one processor is further configured to:
   establish, by starting from a first end of the second trajectory segment that is adjacent to the first trajectory segment and successively for each of the trajectory points to be processed in the second trajectory segment, a sub association relationship between the surrounding road element data of the trajectory point and the road element data in the benchmark road data according to the first road element association relationship of the first sub road data and the surrounding road elements; and
   generate the second road element association relationship according to the respective sub association relationships.

9. The device according to claim 8, wherein the surrounding road element data comprises feature data of each of surrounding road elements, and the at least one processor is further configured to:
   select, successively for each road data to be fused and for each surrounding road element in the respective road data to be fused, a road element associated with the surrounding road element from the benchmark road data according to the feature data of the surrounding road element; and
   generate the first road element association relationship according to the respective surrounding road elements in the road data to be fused and the associated road elements.

10. The device according to claim 8, wherein the at least one processor is further configured to:
    determine adjacent first sub road data of the second sub road data, wherein a first trajectory segment in the adjacent first sub road data is adjacent to a second trajectory segment in the second sub road data;
    establish, by starting from a first end of the second trajectory segment that is adjacent to the first trajectory segment and successively for each of the trajectory points to be processed in the second trajectory segment, a sub association relationship between the surrounding road element data of the trajectory point and the road element data in the benchmark road data according to the first road element association relationship of the adjacent first sub road data;
    determine, when the respective established sub association relationships meet a preset deviation condition and not all of the trajectory points in the second trajectory segment are processed, an intermediate transformation relationship between the second sub road data and the benchmark road data according to the respective established sub association relationships, and transforming the second sub road data based on the intermediate transformation relationship to obtain updated second sub road data;

repeat the above two steps until all of the trajectory points in the second trajectory segment are processed; and generate the second road element association relationship according to the respective established sub association relationships.

11. The device according to claim 10, wherein the number of the adjacent first sub road data is one or two.

12. The device according to claim 8, wherein the at least one processor is further configured to:

determine a first transformation relationship from the first sub road data to the benchmark road data, according to the first road element association relationship between the first sub road data and the benchmark road data;

transform the first sub road data according to the first transformation relationship to obtain transformed first sub road data;

determine a second transformation relationship from the second sub road data to the benchmark road data, according to the second road element association relationship between the second sub road data and the benchmark road data;

transform the second sub road data according to the second transformation relationship to obtain transformed second sub road data; and fuse the transformed first sub road data, the transformed second sub road data, and the benchmark road data to update the benchmark road data.

13. The device according to claim 8, wherein the at least one processor is further configured to:

determine a plurality of road data in the target road area;

determine one of the plurality of road data as the benchmark road data; and determine road data in the plurality of road data other than the benchmark road data as the road data to be fused.

14. The device according to claim 13, wherein the at least one processor is further configured to:

determine a plurality of trajectories in the target road area, and relative coordinate information of the surrounding road elements of the trajectory points in each of the plurality of trajectories;

determine, for each of the trajectory points in each trajectory, the world coordinate information of the surrounding road elements of the trajectory point according to the world coordinate information of the trajectory point and the relative coordinate information of the surrounding road elements of the trajectory point; and generate the road data according to the trajectory and the world coordinate information of the surrounding road elements of the respective trajectory points in the trajectory.

15. A non-transitory computer-readable storage medium having computer instructions stored thereon, wherein the computer instructions are configured to cause a computer to implement a method for fusing road data to generate a map, comprising:

determining benchmark road data and at least one road data to be fused in a target road area, wherein the benchmark road data and the at least one road data to be fused are data collected by a sensor or data collected using a crowdsourcing map, wherein each of the at least one road data to be fused comprises trajectory and surrounding road element data of trajectory points in the trajectory, and the trajectory is obtained by locating with a positioning sensor;

obtaining first sub road data and second sub road data by segmenting the trajectory of the road data to be fused according to a positioning signal quality of the positioning sensor for locating the trajectory, wherein a positioning signal quality of first sub road data is higher than that of second sub road data, and the first sub road data comprises a first trajectory segment and surrounding road element data of trajectory points in the first trajectory segment, the second sub road data comprises a second trajectory segment and surrounding road element data of trajectory points in the second trajectory segment, and the first trajectory segment is adjacent to the second trajectory segment, wherein the surrounding road element data comprises world coordinate information of surrounding road elements, and the surrounding road elements comprises at least one of a lane line or a road traffic sign;

establishing, successively for each road data to be fused, a first road element association relationship between the first sub road data and the benchmark road data according to the surrounding road element data;

establishing a second road element association relationship between the second sub road data and the benchmark road data according to the first road element association relationship;

fusing the benchmark road data and the road data to be fused according to the first road element association relationship and the second road element association relationship to update the benchmark road data, until all of the at least one road data to be fused is processed, to obtain road area data of the target road area; and generating an autonomous driving map of the target road area according to the road area data, and sending the autonomous driving map to an autonomous driving vehicle for autonomous driving, wherein the autonomous driving map comprises the lane line, and the autonomous driving comprises autonomous driving based on the lane line of the autonomous driving map; and providing the autonomous driving map to the autonomous driving vehicle and causing the vehicle to perform autonomous driving based on the lane line represented in the autonomous driving map, wherein establishing the second road element association relationship between the second sub road data and the benchmark road data according to the first road element association relationship comprises:

establishing, by starting from a first end of the second trajectory segment that is adjacent to the first trajectory segment and successively for each of the trajectory points to be processed in the second trajectory segment, a sub association relationship between the surrounding road element data of the trajectory point and the road element data in the benchmark road data according to the first road element association relationship of the first sub road data and the surrounding road elements; and generating the second road element association relationship according to the respective sub association relationships.

* * * * *